G. B. SMITH.
CAKE BEATER.
APPLICATION FILED SEPT. 1, 1908. RENEWED OCT. 19, 1909.
959,811.
Patented May 31, 1910.
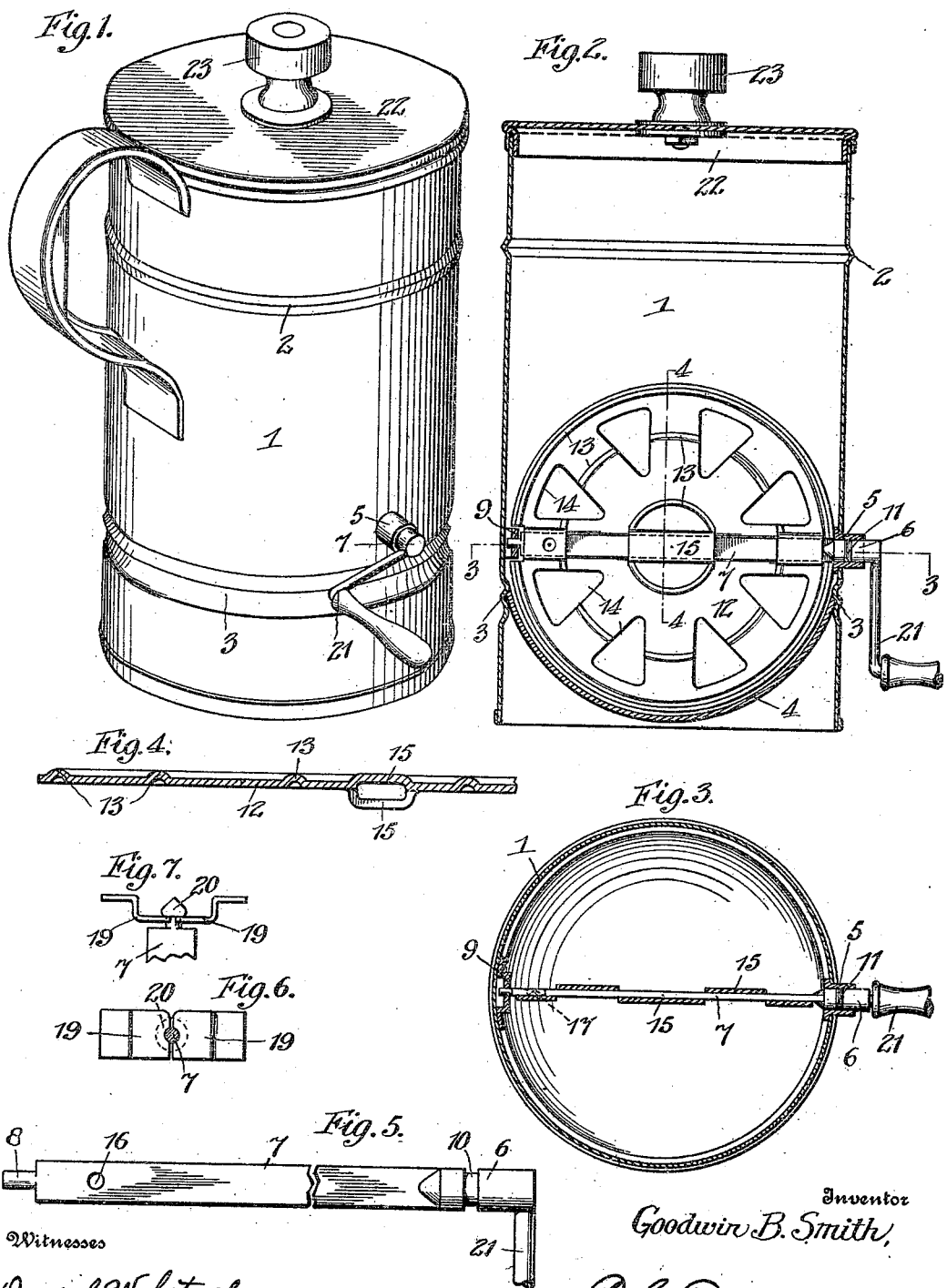
Witnesses
Daniel Webster, Jr.
Myron G. Clear
Inventor
Goodwin B. Smith,
By C. L. Parker
Attorney

UNITED STATES PATENT OFFICE.

GOODWIN B. SMITH, OF PHILADELPHIA, PENNSYLVANIA.

CAKE-BEATER.

959,811.     Specification of Letters Patent.     Patented May 31, 1910.

Application filed September 1, 1908, Serial No. 451,184. Renewed October 19, 1909. Serial No. 523,427.

*To all whom it may concern:*

Be it known that I, GOODWIN B. SMITH, a citizen of the United States, residing at Philadelphia, in the county of Philadelphia and State of Pennsylvania, have invented certain new and useful Improvements in Cake-Beaters, of which the following is a specification.

My invention relates to improvements in beaters for eggs, batter and similar material, and particularly contemplates the provision of certain novel and useful features tending to produce a more simple and successful operating construction than has heretofore been the case.

The objects and advantages of my improved device will be readily understood from the following description, in which reference is made to the accompanying drawings, forming a part of this specification, wherein like numerals are used to designate like parts throughout the several figures, and wherein, Figure 1 is an elevation in perspective, of my improved device. Fig. 2 is a central vertical sectional view taken therethrough. Fig. 3 is a horizontal sectional view taken therethrough on the line 3—3 of Fig. 2. Fig. 4 is a transverse sectional view through a portion of a dasher, on the line 4—4 thereof, as shown in Fig. 2. Fig. 5 is a side elevation of the axle or dasher shaft, with its handle partially broken away, and, Figs. 6 and 7 are respectively a side elevation and top plan view of modified means for locking the dasher, and its shaft within the vessel.

Referring to the drawings, I provide an upright cylindrical vessel 1, provided with corrugations 2 and 3 in its circular wall, respectively adjacent the upper and lower ends thereof, said lower corrugations 3 being adapted for the secure reception of the upper circular edge of a semi-spherical bottom 4, for said vessel, the base of which bottom 4 terminates slightly above the plane of the lower circular edge of said vessel 1. Slightly above its lower corrugations 3, the vessel 1 is provided in its circular wall with an opening through which is projected a tubular journal 5, flanged within said vessel to prevent the withdrawal therefrom, and adapted for the reception rotatively therein, of the circular outer end 6, of an axle or dasher shaft 7, the body of which extends transversely through said vessel 1, and is rectangular in cross section. The inner end of the rectangular body of the axle or shaft 7, is provided with a reduced circular extremity 8 projecting through an opening in a bracket 9 secured upon the internal surface of the circular wall of the vessel 1, diametrically opposite to its tubular journal 5. The circular end 6 of the axle or shaft 7, is provided with an intermediate circular recess 10, adapted for the reception of a suitable packing ring 11 shown in Fig. 2, and closely contacting with the internal surface of the tubular journal 5, in order to prevent the leakage of material from the vessel 1. A circular dasher 12, is provided with concentric strengthening corrugations 13, and with radially disposed triangular cut out portions 14. The dasher 12 is further provided with a diametrically extending series of spaced transverse slits, and with its homogeneous material 15 between said slits, pressed outwardly in alternately opposite directions to provide a channel through which the rectangular body of the axle or shaft 7, passes. The dasher 12 and its shaft 7, may be prevented from accidental displacement within the vessel 1, by locking the same together, in which case, the rectangular body of the axle or shaft 7 may be provided with a depression 16, and one of the depressed portions 15 of said dasher may be provided with a projection 17, adapted for relative engagement with said depression 16.

In another form of securing the dasher and its shaft or axle within the vessel 1, the bracket carried by said vessel to receive the inner end of said shaft, may be formed of separate opposing spring sections 19, having semicircular cut out portions in their opposing edges, and the reduced circular end 8 of the shaft 7, may be provided with an enlarged pointed end 20 adapted to be projected between the said spring sections 19, and into locking engagement therewith. The outer circular end 6 of the shaft or axle 7, is provided with a crank handle 21 by which the same and said dasher 12 may be rotated and the vessel 1 may be provided with a circular cover 22, having a handle 23 for inserting and withdrawing the same.

The operation and advantages of my invention will be readily understood. After the batter or other mixture has been properly beaten, a quick, sharp, pull upon the axle or shaft 7 tends to release the same, for withdrawal from the dasher 12, and also from the vessel 1. The dasher 12 may then be removed, and the parts more readily, quickly and thoroughly cleaned in the absence of recesses, cracks, or crevices. The device possesses unusual sanitary qualities, and cheapness of construction.

Having fully described my invention, I claim:

A vessel provided with a journal through its wall, and with a journal bracket secured therein, diametrically opposite to said first named journal, and a dasher shaft for engagement through said first named journal and provided with a reduced headed end, said journal bracket comprising opposing non-contacting and horizontally alined spring members for detachable engagement with said headed shaft end, substantially as described.

In testimony whereof I affix my signature in presence of two witnesses.

GOODWIN B. SMITH.

Witnesses:
K. V. O'HARA,
LEIGHTON P. STRADLEY.